United States Patent [19]

Bustos

[11] E Re. 30,706

[45] Reissued Aug. 11, 1981

[54] DISPLAY RACK WITH IMPROVED SHELF ASSEMBLY

[75] Inventor: Rafael T. Bustos, Clarkston, Ga.

[73] Assignee: Leggett & Platt, Incorporated, Carthage, Mo.

[21] Appl. No.: 48,276

[22] Filed: Jun. 13, 1979

Related U.S. Patent Documents

Reissue of:

[64] Patent No.: 4,128,177
Issued: Dec. 5, 1978
Appl. No.: 844,202
Filed: Oct. 21, 1977

[51] Int. Cl.[3] ..... A47F 5/00
[52] U.S. Cl. ..... 211/49 D; 193/2 D
[58] Field of Search ..... 211/49 D, 121, 122, 211/151; 221/253; 312/45, 91; 193/2 D; 198/688

[56] References Cited

U.S. PATENT DOCUMENTS

| | | | |
|---|---|---|---|
| 997,276 | 7/1911 | Cortis | 193/2 D |
| 1,495,402 | 5/1924 | Daniel | 193/2 D |
| 2,218,444 | 10/1940 | Vineyard | 211/49 D |
| 2,234,424 | 3/1941 | Alley | 312/45 |
| 3,203,553 | 8/1965 | Pendergrast et al. | 211/49 D |
| 3,203,554 | 8/1965 | Pendergrast et al. | 211/49 D |
| 3,776,145 | 12/1973 | Anderson et al. | 108/51.1 |
| 3,900,112 | 8/1975 | Azzi et al. | 211/151 X |

FOREIGN PATENT DOCUMENTS

| | | | |
|---|---|---|---|
| 650703 | 2/1951 | United Kingdom | 108/51.3 |

*Primary Examiner*—Roy D. Frazier
*Assistant Examiner*—Robert W. Gibson, Jr.
*Attorney, Agent, or Firm*—Wood, Herron & Evans

[57] ABSTRACT

A display rack with an improved shelf assembly that gravity feeds a column of containers one after another to the front edge of a shelf as that column's lead containers are successively removed by customers. The shelf assembly includes a conveyor belt oriented so that its travel path is generally perpendicular to the shelf's front edge, the belt being adapted to receive a plurality of containers, e.g., bottles or cans, in a vertical or stand-up fashion thereon. The inside surface of the belt rides over a support floor and has a low coefficient of friction, and the outside surface of the belt on which the containers rest has a high coefficient of friction, relative one to the other. When the lead container on the belt at the front edge of the shelf is removed, and because of the low friction coefficient on the belt's inside surface, gravity on the remaining containers causes the belt to slide or move forwardly over the stationary support floor, thereby moving all remaining containers in that column forwardly on the shelf until the next forward container abuts a bumper at the shelf's front edge. But the containers on the belt do not move relative to the belt as the belt moves or as it stops because of the high friction coefficient on the belt's outside surface, thereby preventing the containers from impacting against one another as the column moves forward after a customer removes the lead container thereon.

9 Claims, 7 Drawing Figures

DISPLAY RACK WITH IMPROVED SHELF ASSEMBLY

Matter enclosed in heavy brackets [ ] appears in the original patent but forms no part of this reissue specification; matter printed in italics indicates the additions made by reissue.

This invention relates to display racks. More particularly this invention relates to an improved display rack of the gravity feed type.

Display racks are often used in supermarkets, as well as in other types of stores, to display items of merchandise generally handled as self-service items. For example, display racks are often used in supermarkets to display cans or bottles of soft drinks, the cans or bottles being removable for purchase by the customer in a self-service manner from the display rack.

Historically, display racks originally were comprised of a plurality of planar horizontal shelves held in spaced relation by vertical cornerposts, the packages or containers thereon, e.g., cans or bottles of soft drinks, being arranged on each shelf in adjacent rows parallel to the shelf's front edge from the shelf's front edge to the shelf's rear edge. In this type of prior art display rack structure, the prospective customers first remove the containers at the front edge of the shelf, i.e., in the front row, then remove the containers in the second row, then from the third row, and so forth until the shelf is emptied. However, access to the containers on a shelf in the rear rows, and across the width of the rack, is impeded if the shelf is of significant depth or if another shelf is above that shelf. This makes it difficult for customers to reach the merchandise in the first instance and, perhaps as importantly, tends to hide the merchandise from display in the second instance if a partially filled shelf has another shelf disposed above it. Thus, it is highly desirable to provide a shelf structure for a display rack in which the front row of the shelf is always filled with containers for two reasons. The first reason is so that all the containers displayed on the shelf will be presented at an easily accesible position to the retail customer. The second reason is so that, after the front rows of containers have been removed from the shelf, the remaining product displayed on the shelf is still visually displayed in full to the customer at the rack's front face, and is not partially hidden by virtue of being disposed, e.g., in a rear area of the shelf.

A couple of different types of display rack structures have been developed over the years which tend to solve the merchandising problems present in the historical display rack structure as discussed above. These types of display rack structures incorporate the concept of slanted or sloped shelves on which the merchandise is stored or displayed. When the front product in a given column on a shelf is removed, gravity causes the products behind that front product to move forwardly in the column until stopped at the front edge of the shelf. One typical type of gravity feed shelf assembly for a display rack is illustrated in Pendergrast, Jr., et al. U.S. Pat. No. 3,203,553 and Shield U.S. Pat. No. 2,443,871. These two patents disclose gravity feed can racks in which the cans are disposed horizontal so that the rear cans in a shelf column can roll down the sloped shelf in response to removal of the lead can in that column. Another type of gravity feed shelf assembly is illustrated in Bergstedt U.S. Pat. No. 3,279,618. In the Bergstedt patent, vertically disposed cans slide down a sloped shelf structure to the front edge thereof. Another type rack structure, as used for a storage rack, is illustrated in Azzi et al. U.S. Pat. No. 3,900,112. The Azzi et al. rack structure incorporates skate wheels in a sloped shelf structure so as to promote movement of the articles from the rear of the shelf to the front of the shelf when the article at the front of the shelf has been removed.

In each of these prior art shelf assemblies, however, a significant problem arises particularly if the containers displayed thereon are of a frangible nature, e.g., glass bottles. In each of the prior art structural concepts, the remaining containers in any one shelf column impact against the new lead container in that column, and against one another, as the column moves forwardly due to gravity after removal of the old lead container in that column. In other words, and in the case of containers within a column in a gravity feed shelf structure of those types known to the prior art, the containers tend to move individually or independent one of another and, therefore, the containers tend to impact or hit one another in backlash fashion as they come to a stop against a new lead container, and against one another, upon moving forward due to gravity. This may create a problem of some significance for certain types of containers on a display rack in that it can result in broken or chipped bottles or dented cans, in the case of those types of containers. Also, this problem can result in disfigured or marked up artwork on the containers in the case of cans or bottles.

Accordingly, it has been one objective of this invention to provide a novel display rack incorporating an improved shelf assembly of the gravity feed type, that shelf assembly including a column feed unit that carries containers on a belt, the belt being movable in response to gravity so as to move the entire column of containers forwardly together after removal of the lead container in the column.

It has been another objective of this invention to provide a novel display rack incorporating an improved gravity feed shelf assembly in which a conveyor belt is supported by a sloping support floor on the underside of its container run, the conveyor having a low coefficient of friction on its inside surface and a high coefficient of friction on its outside surface, the high friction coefficient on the outside surface maintaining a plurality of containers on the belt in nonsliding relation one to the other, and the low friction coefficient on the inside surface permitting the belt to slide over the sloping support floor, thereby permitting the entire container column to move forward together in response to removal of a lead container from that column.

In accord with these objectives, the display rack of this invention includes an improved shelf assembly that gravity feeds a column of containers one after another to the front edge of a shelf as that column's lead containers are successively removed by customers. The shelf assembly includes a conveyor belt oriented so that its travel path is generally perpendicular to the shelf's front edge, the belt being adapted to receive a plurality of containers, e.g., bottles or cans, in a vertical or stand-up fashion thereon. The conveyor belt slopes upwardly from the shelf's front edge toward the shelf's rear edge at a shelf angle such that the containers on the belt do not tip over. The upper run of the conveyor belt is supported from the underside by a support floor. A bumper at the front edge of the shelf prevents the lead container on the belt from falling off over the front edge of the shelf. The inside surface of the belt which rides over the support floor has a low coefficient of friction, and the outside surface of the belt on which the containers rest has a high coefficient of friction, relative one to the other. When the lead container on the belt at the front edge of the shelf is removed, and because of the low friction coefficient on the belt's inside surface, gravity on the remaining containers causes the belt to slide or move forwardly over the stationary support floor, thereby moving all remaining containers in that column forwardly on the shelf until the next forward container abuts the bumper at the shelf's front edge. But the containers on the belt do not move relative to the belt as the belt moves or as it stops because of the high friction coefficient on the belt's outside surface, thereby preventing the containers from impacting against one another as the column moves forward after a customer removes the lead container thereon.

Other objectives and advantages of this invention will be more apparent from the following detailed description taken in conjunction with the drawings in which.

Figure 5:
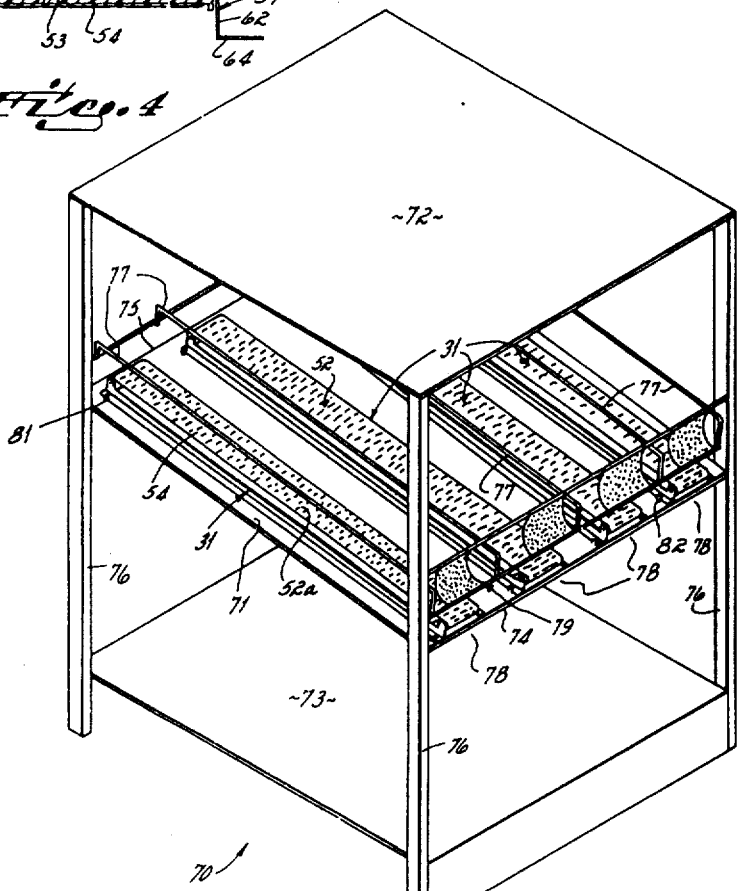
Figure 6:
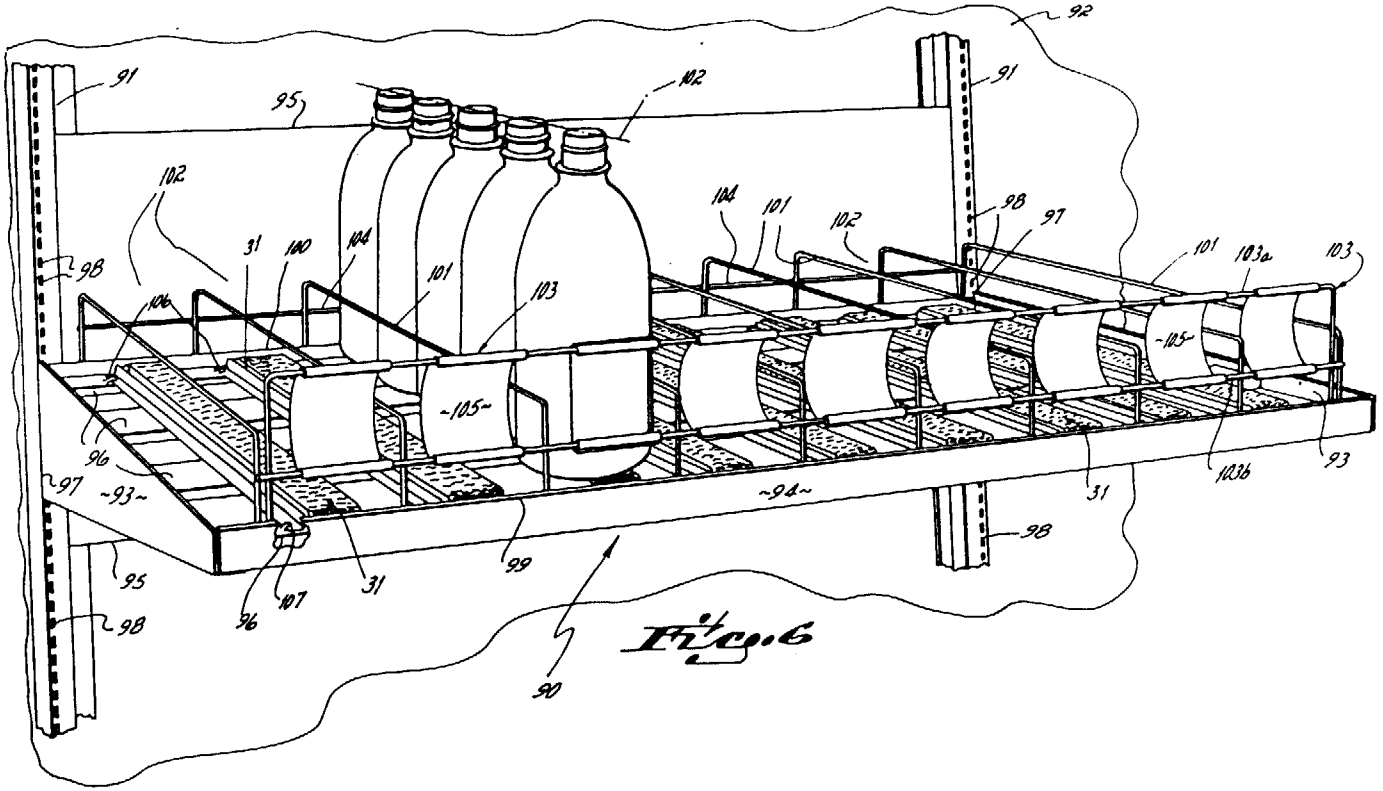

FIG. 5 is a perspective view illustrating a plurality of friction belt assemblies fixed to a slanted shelf in a four corner post rack structure to provide a first alternative embodiment of an improved shelf assembly for a display rack in accord with the principles of this invention; and FIG. 6 is a perspective view illustrating a plurality of friction belt assemblies fixed to a cantilevered shelf in a two corner post rack structure to provide a second alternative embodiment.

Figure 1:
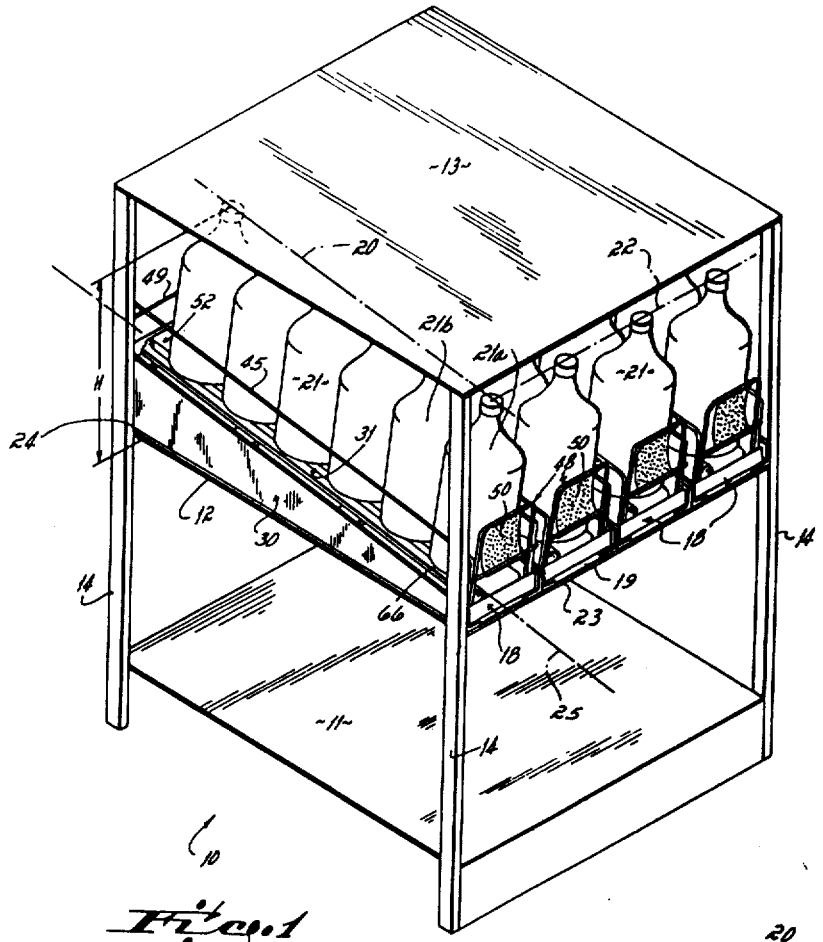
FIG. 1 is a perspective view illustrating a plurality of container column feed units positioned on a horizontal shelf to provide an improved shelf assembly for a display rack in accord with the principles of this invention.

A display rack 10 in accord with the principles of this invention is illustrated in FIG. 1. As shown in that Figure, the display rack 10 includes three shelves 11, 12, 13 and four cornerposts 14, the shelves being connected with the cornerposts at the respective corners thereof in any known fashion. Four container column feed units 18 are illustrated on one 12 of the shelves 11–13 of that display rack. The units 18 are separate one from another, and simply rest on the flat surface 19 of the shelf 12. Each of the units 18 is adapted to receive a column 20 of containers, e.g., bottles 21 as shown, and the bottles in adjacent units 18 defining rows 22 of bottles parallel to the front 23 and rear 24 edges of the shelf 12. The columns 20, of course, are disposed normal or perpendicular to the front 23 and rear 24 edges of the shelf 12. Note particularly that each container column feed unit 18 presents a support plane 25 defined by the unit that slopes or slants upwardly from the front edge 23 toward the rear edge 24 of the shelf 12 so that the bottles 21 toward the rear of the unit 18, i.e., toward the rear edge of the shelf, are disposed at a height H above the horizontal shelf 12 substantially greater than the lead bottle 21a at the front edge of the shelf. For purposes of this invention, the front edge 23 of the display rack 10, and of each shelf 11–13, is considered to be that edge normally approached by a customer when removing a container, e.g., bottle 21a, from the display rack.

Figure 2A:
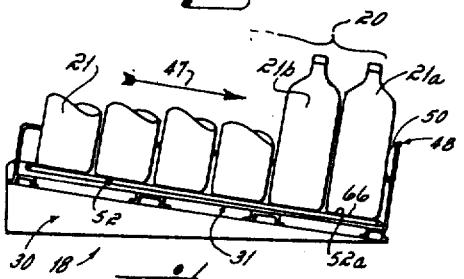
FIGS. 2A and 2B are side views of that unit shown in FIG. 2 illustrating use of the unit.
Figure 2B:
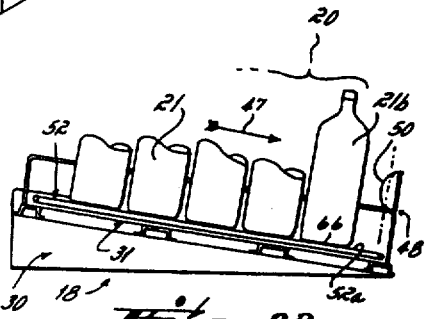
Figure 2:
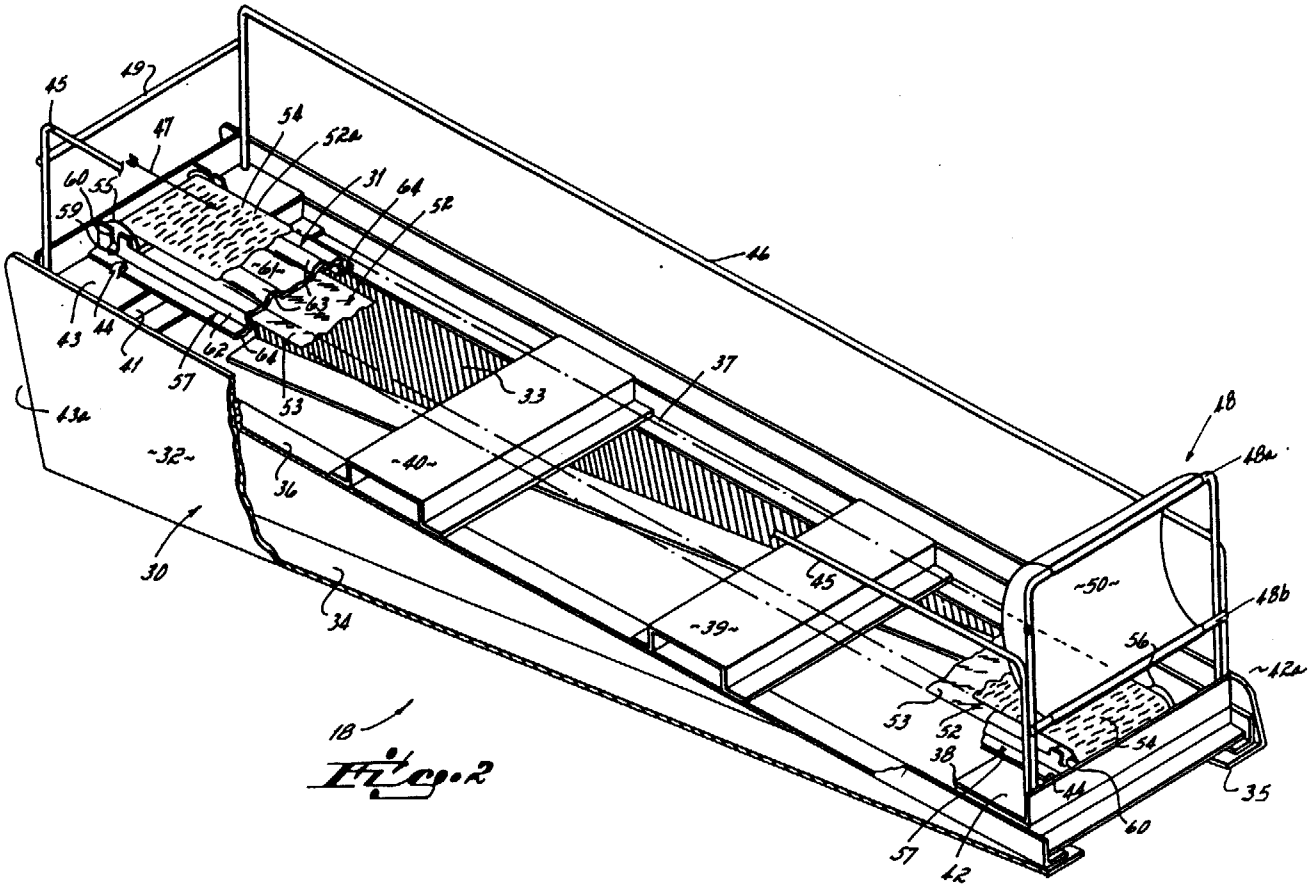
FIG. 2 is a perspective view, partially broken away, illustrating one of the container column feed units shown in FIG. 1.
Figure 3:
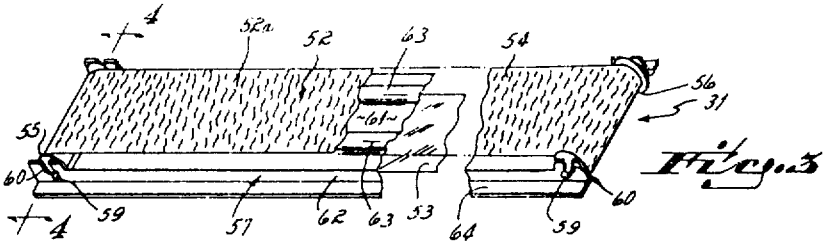
FIG. 3 is a perspective view, partially broken away, illustrating the friction belt assembly, of that unit illustrated in FIG. 2.
Figure 4:
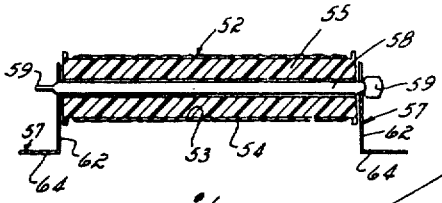
FIG. 4 is a cross-sectional view taken along line 4—4 of FIG. 3.

One of the container column feed units 18 illustrated in FIG. 1 is shown in structural detail in FIGS. 2–4. As shown in those Figures each unit 18 is basically comprised of framework 30 (see FIG. 2), and a friction belt assembly 31 (see FIGS. 3 and 4). The unit's framework 30 includes opposed side walls 32, 33, each of the side walls including a linear inwardly turned foot flange 34, 35 on which the unit 18 rests when seated or positioned on shelf 12. Each side wall 32, 33 also includes a linear inner rail 36, 37 fixed to the respective side wall, each inner rail forming an acute angle with its respective foot flange 34 or 35 when viewed from the side of the unit 18, the inner rails being parallel and coplanar one with the other within the framework 30. The inner rails 36, 37 cooperate to receive spaced brace members 38–41 in fixed relation between the rails 36, 37 along the length thereof. The brace members 38–41 and the side walls 32, 33 are preferably fabricated of sheet metal, and are welded one to the other to provide a rigid framework 30 for the container column feed unit 18.

The unit's framework 30 also includes belt mounting plates 42, 43 at the front 42a and rear 43a ends thereof, each of the mounting plates including tabs 44 struck upwardly therefrom adjacent opposite sides of that mounting plate. The mounting plates 42, 43 are adapted to receive a belt assembly 31 in fixed relation therewith, thereby connecting the belt assembly (shown in FIG. 3) in fixed relation with the unit's framework 30. The unit's framework 30 also includes side rails 45, 56 positioned on each side of the belt assembly 31, and oriented parallel to the container feed path (indicated by arrow 47) of the belt assembly 31. The side rails 45, 46 are welded to the shelf support structure and, in effect, function to define the effective width of the column 20 of containers served by a unit 18. The unit's framework 30 also includes front 48 and rear 49 bumper rails welded between the side rails 45, 46, the bumper rails and the side rails serving to maintain the bottles 21 in columnar configuration on the container column feed unit 18. Note particularly that the front bumper rail 48 is comprised of an upper 48a and lower 48b rail, a flexible plastic bumper 50 of concave configuration being carried between those upper and lower bumper rails. The flexible plastic front bumper so formed provides a soft cushion type bumper against which the lead bottle 21a in the column 20 of bottles on the feed unit 18 can abut as the belt assembly 31 operates due to gravity after removal of the lead bottle as explained in detail below.

The belt assembly 31 itself is illustrated in FIGS. 3 and 4. As shown in FIG. 3, the belt assembly 31 includes an endless belt 52 having a low coefficient of friction on the inside surface 53 thereof, and having a high coefficient of friction on the outside surface 54 thereof, the degree of high friction and low friction being relative one to the other. The endless belt 52 is wound around idler spools 55, 56 at each end of a floor frame 57. Each of the spools 55, 56 is a one-piece molded spool with a shaft 58 therethrough, the shafts being flatted at each end as at 59 for retaining the spool on the shaft. The idler spools 55, 56 are carried in opposite ends of floor frame 57 in slots 60 defined in the floor frame.

The belt assembly's floor frame 57 is comprised of a support floor 61 with downwardly depending side walls 62. Note particularly that the support floor 61 is provided with two linear ribs 63 longitudinally thereof, the ribs underlying the inside surface 53 of the conveyor belt 52 for supporting the belt and, thereby for supporting bottles 21 loaded on the belt in columnar configuration. Thus, upper run 52a of the conveyor belt 52 is supported on its underside by a support floor 61 which includes the two linear ribs 63 that parallel the container feed path 47 of the containers 21. The belt assembly's floor frame 57 also includes connector flanges 64 extending outwardly from the side walls 62 from one end to the other. The connector flanges 64, at each end, are adapted to be received under tabs 44 struck out of the belt mounting plates 42, 43, and are also adapted to rest on the intermediate structural brace member 39, 40, thereby supporting the floor frame 57 and, hence the support floor 61, from one end thereof to the other in an angled or sloped attitude relative to horizontal.

Use of the container column feed unit 18 is as illustrated in FIGS. 2A and 2B. As shown therein, when fully loaded with bottles 21 the unit 18 is adapted to hold a column 20 of bottles from the front bumper 48 to the rear bumper 49 thereof, the column of bottles being sloped upwardly from the front edge 23 to the rear edge 24 of the shelf 12. The bottles 21 are initially positioned on the high friction coefficient or outside surface 54 of the conveyor belt 52, and the bottles are supported from underneath the belt 52 by the floor frame's longitudinal linear ribs 63 (the support floor 61 and floor frame 57 providing the sloped support plane 25). The bottles 21 are positioned on the belt in generally vertical fashion (although the bottles tip forward slightly as shown in the Figures because of the slope of the support plane 25), and may be spaced slightly one from another if desired. The rear bottles 21 of the column do not slide toward the front bottles in the column after being loaded on the unit 18 because of the high friction coefficient surface 54 of the belt, i.e., the bottles 21 stay in the spaced relation as initially presented because the high friction coefficient surface 54 prevents sliding of the bottles on the belt 52. The column 20 of bottles 21 as initially loaded, and as shown in FIG. 2A, is retained in the attitude shown in that Figure by virtue of the lead bottle's abutting contact with the flexible concave bumper 50.

After the lead bottle 21a has been removed by a prospective customer, gravity force on the remaining bottles in the column 20 overcomes the frictional contact between the belt's inside surface 53 and the floor's longitudinal linear ribs 63 so that the coveyor belt 52 moves forward in the direction illustrated by arrow 47, thereby carrying with it the remaining bottles thereon, see FIG. 2B. In other words, and after the old lead bottle 21a has been removed from the column 20, gravity induces the conveyor belt 52 to slide forwardly in the direction of arrow 47 on the support floor 61 until new lead bottle 21b abuts bumper 50. This forward motion is induced by gravity because of the low frictional resistance between the inside surface 53 of the belt 52 and the two longitudinal linear ribs on the floor. On the other hand, the bottles supported on the top surface 54 of the belt 52 remain in the predetermined, and preferably slightly spaced, relation as initially loaded onto that belt during forward sliding movement 47 of the belt because of the high friction contact between the bottles'bases 63 and the outside surface 54 of the belt 52.

As the belt 52 moves forwardly in response to gravity, the second bottle 21b in the original column 20 becomes the lead bottle and abuts the concave bumper 50. When the second or new lead bottle 21b abuts the concave bumper 50, the bumper may flex slightly to provide an easy bumpered stop for the new lead bottle 21b. When the new lead bottle 21b is stopped by the bumper 50 (see phantom line position in FIG. 2B), and because of the frictional relation between the new lead bottle's base 66 and the outside surface 54 of the conveyor belt 52, the belt itself stops. Further, and because of the frictional contact between successive bottles behind the new lead bottle 21b on the belt, those successive bottles are also immediately stopped. No significant sliding of the successive bottles on the belt 52 occurs against the new lead bottle 21b, or against one another and, therefore, no significant impacting of the remaining bottles along the column 20 occurs as those bottles move forwardly in response to the withdrawal of the old lead bottle 21a.

A first alternative embodiment of this invention is illustrated in FIG. 5. As shown in the first alternative embodiment, the display rack 70 itself is provided a shelf 71 angled relative to horizontal. In the FIG. 5 structure, the middle shelf of the three shelves, 71–73 shown is angled upwardly from the front edge 74 to the rear edge 75 thereof, i.e., sloped relative to horizontal. All three of the shelves 71–73, i.e., the top 72 and bottom 73 horizontal shelves, and the middle sloping shelf 71, are connected at each of the four corners to respective cornerposts 76 in known fashion.

The sloping shelf 71 is provided, as shown in FIG. 5, with a plurality of column side rails 77 normal or perpendicular to the front edge 74 thereof. The column side rails 77 sub-divide the shelf 71 across the width thereof into a plurality of columns 78. Also, the sloping shelf 71 is provided with a front rail or bumper rail 79 that extends across the width of the shelf above the front edge 74 thereof. Each of the columned off areas 78 of each sloping shelf is provided with a friction belt assembly 31 as illustrated in FIGS. 3 and 4. Each friction belt assembly 31 is connected with shelf 71 in a columnar area 78 through use of a pair of rear tabs 81, and a pair of front tabs 82. The tabs 81, 82 cooperate with the connector flanges 64 on the friction belt assembly 31 to retain that assembly in fixed engagement with the sloping shelf 71. Thus, the primary difference between the first embodiment illustrated in FIGS. 1–4 and the second embodiment illustrated in FIG. 5 is that a plurality of separate container column feed units 18 are simply positioned on a horizontal shelf in the FIGS. 1–4 embodiment across the width thereof, whereas in the FIG. 5 embodiment the shelf is already sloped and is adapted to interfit with a plurality of friction belt assemblies 31 only.

Use of the FIG. 5 embodiment is the same as described above in connection with the FIGS. 1–4 embodiment.

A second alternative embodiment of this invention is illustrated in FIG. 6. As shown in the second alternative embodiment, a plurality of friction belt assemblies 31 are fixed to a cantilevered shelf 90 in a two corner post 91 display rack structure. The two corner posts 91 are fixed to, for example, a wall 92 in known fashion. The cantilevered shelf 90 is comprised of opposed side walls 93, a front wall 94, a rear wall 95, and a floor flame comprised of a plurality of parallel floor rails 96 extending between the side walls, all of which are welded together into a one-piece configuration. The rear corners 97 of the shelf structure are provided with hooked fingers (not shown) adapted to be received in connecting relation with slots 98 disposed on the corner posts 91 from the top to bottom thereof, thereby permitting the shelf 90 to be located at the desired height level relative to ground (not shown) in known fashion as desired by the user. The floor of the shelf, as defined by the floor rails 96, is thereby angled relative to horizontal, the shelf's floor being angled upwardly from the front edge 99 to the rear edge 100 thereof.

The shelf 90 is provided, as shown in FIG. 6, with a plurality of column side rails 101 normal or perpendicular to the front edge 99 thereof, the side rails defining nine columns 102 as shown in that Figure. Also, the sloping shelf 90 is provided with a front or bumper rail 103 that extends across the width of the shelf above the front edge 99, and a rear bumper rail 104 that extends across the width of the shelf above the rear edge 100 thereof. The front bumper rail 103 is comprised of an upper 103a and a lower 103b bumper rail, flexible plastic bumpers 105 being interconnected therewith for each of the columns 102 defined. The side rails 101, front 103 and rear 104 bumper rails are welded to the shelf 90 structure, and to one another, to provide an integrated and rigid structural definition for the columns 102.

Each of the columned off areas 102 of the sloping shelf is provided with a friction belt assembly 31 as illustrated in FIGS. 3 and 4. Each friction belt assembly 31 is connected with that shelf 90 in a columnar area 102 through use of a pair of rear tabs 106, and a pair of front tabs 107. The tabs 106, 107 cooperate with the connector flanges on the friction belt assembly 31 to retain that assembly in fixed relation with the shelf.

Use of the FIG. 6 embodiment is the same as described above in connection with the FIGS. 1–4 embodiment.

A third alternative embodiment, not illustrated in the drawings, involves use of a conveyor belt having substantially the same coefficient of friction on both the inside and the outside surfaces thereof. However, and in this embodiment, the single surface friction coefficient belt is connected in operative relation with a sloping shelf that includes a belt support structure, e.g., similar to ribs 63 in the FIGS. 1–4 embodiment, which is of a significantly reduced friction coefficient relative to the belt surface's coefficient of friction. In this regard, and if the structural embodiment of FIGS. 1–4 was used with the belt 52 modified so that it had substantially the same friction coefficient on the inside surface 53 as on the outside surface 54, it would be desirable to coat the rib 63 with a low coefficient of friction material relative to the friction coefficient of the belt. One useful low friction coefficient material would be, e.g., polytetrafluroethylene sold under the trademark TEFLON. In this alternative embodiment, and as in the earlier embodiments, the friction coefficient of the belt's outer surface would be sufficient to maintain the column of containers in relatively immobile relation thereon when the lead container in the column is withdrawn as the column moves forwardly and then abuts the front edge bumper of the display rack. Also as in the earlier embodiments, the forward movement of the belt would be achieved due to gravity because of the low coefficient of friction support surface, e.g., of TEFLON, for the inside surface of the conveyor belt.

Having described in detail the preferred embodiments of my invention, what I desire to claim and protect by Letters Patent is:

1. A display rack with an improved shelf assembly that gravity feeds a column of containers one after another to the front edge of a shelf as that column's lead containers are successively removed by a customer, said display rack comprising a conveyor belt disposed at an angle relative to the horizontal, said conveyor belt sloping generally upward from the front edge of said shelf, each container in said column being positioned in generally vertical fashion on said belt during use of said rack, a support floor disposed beneath said conveyor belt, said conveyor belt and said support floor cooperating to support said containers in said column on the upper surface of said belt, the upper surface of said conveyor belt having a friction relation with said containers that inhibits movement on said belt of said containers relative one to the other, and said support floor and the under surface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, and a bumper rail disposed adjacent the front edge of said shelf, said conveyor belt conveying all of said containers in said column forward together toward said bumper in response to gravity on the remaining containers in said column after removal of the lead containers from said column, said conveyor belt and said container column being stopped by contact of the container in back of the lead container with said bumper rail, thereby positioning a new lead container adjacent the front edge of said shelf.

2. A display rack as set forth in claim 1, the outside surface of said conveyor belt having a high coefficient of friction, and the inside surface of said conveyor belt having a low coefficient of friction, relative one to the other.

3. A display rack as set forth in claim 1 in which said conveyor belt is an endless conveyor belt, said endless conveyor belt passing around an idler spool at each end thereof, said idler spool permitting the upper run of said conveyor belt to pass above said support floor and the lower run to pass beneath said support floor.

4. A display rack as set forth in claim 3 in which said shelf is horizontal, said rack including framework adapted to rest on said shelf, said framework carrying said conveyor belt and bumper rail thereon, thereby providing a removable container column feed unit for use with the horizontal shelf.

5. A display rack as set forth in claim 3 in which said shelf slopes upward from the front edge thereof, the upper run of said conveyor belt being disposed generally parallel to the sloping shelf.

6. A display rack as set forth in claim 3 including side rails extending along the length of said conveyor belt from one end thereof to the other, said side rails cooperating with said front bumper rail to define the columnar configuration for the containers carried on said conveyor belt.

*7. A display rack with an improved shelf assembly that gravity feeds a column of containers one after another to the front edge of a shelf as that column's lead containers are successively removed by a customer, said display rack comprising*

*a conveyor belt disposed at an angle relative to the horizontal, said conveyor belt sloping generally upward from the front edge of said shelf, each container in said column being positioned in generally vertical fashion on said belt during use of said rack,*

*a support floor disposed beneath said conveyor belt, said conveyor belt and said support floor cooperating to support said containers in said column on the upper surface of said belt,*

*the upper surface of said conveyor belt having a friction relation with said containers that inhibits movement on said belt of said containers relative one to the other, and said support floor and the under surface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack.*

*8. A display rack with an improved shelf assembly that gravity feeds a column of containers one after another to the front edge of a shelf as that column's lead containers are successively removed by a customer, said display rack comprising*

*a conveyor belt disposed at an angle relative to the horizontal, said conveyor belt sloping generally upward from the front edge of said shelf, each container in said column being positioned in generally vertical fashion on said belt during use of said rack,*

*a support floor disposed beneath said conveyor belt, said conveyor belt and said support floor cooperating to support said containers in said column on the upper surface of said belt,*

*the upper surface of said conveyor belt having a friction relation with said containers that inhibits movement on said belt of said containers relative one to the other, and said support floor and the under surface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, and*

*means at the front of said shelf for stopping the gravity-urged movement of said containers beyond the front of said shelf.*

*9. A display rack with an improved shelf assembly that gravity feeds a column of containers one after another to the front edge of a shelf as that column's lead containers are successively removed by a customer, said display rack comprising*

*a conveyor belt disposed at an angle relative to the horizontal, said conveyor belt sloping generally upward from the front edge of said shelf, each container in said column being positioned in generally vertical fashion on said belt during use of said rack,*

*a support floor disposed beneath said conveyor belt, said conveyor belt and said support floor cooperating to support said containers in said column on the upper surface of said belt,*

*the upper surface of said conveyor belt having a friction relation with said containers that inhibits movement on said belt of said containers relative one to the other, and said support floor and the under surface of said conveyor belt having a friction relation with one another that allows movement of said belt over said support floor when said belt is at least partially loaded with containers and when not restrained against movement, said friction relationships being such that said belt can slide over said support floor while said containers remain generally stationary relative one to the other on said conveyor belt after removal of the column's lead container during use of said rack, and*

*a bumper rail disposed adjacent the front edge of said shelf, said conveyor belt conveying all of said containers in said column forward together toward said bumper in response to gravity on the remaining containers in said column after removal of the lead containers from said column thereby positioning a new lead container adjacent the front edge of said shelf, said bumper rail being operative to prevent the lead container on said conveyor belt from falling off over the front edge of the shelf.*

* * * * *